US012762775B2

(12) United States Patent
Wood et al.

(10) Patent No.: US 12,762,775 B2
(45) Date of Patent: Oct. 13, 2026

(54) REAL-TIME ANIMATION MOTION CAPTURE

(71) Applicant: Disney Enterprises, Inc., Burbank, CA (US)

(72) Inventors: Andrew E. Wood, Los Angeles, CA (US); Katharine S. Navarre, Sherman Oaks, CA (US); Evan A. Binder, Burbank, CA (US); Drew E. Perlman, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 40 days.

(21) Appl. No.: 17/344,603

(22) Filed: Jun. 10, 2021

(65) Prior Publication Data

US 2021/0390752 A1 Dec. 16, 2021

Related U.S. Application Data

(60) Provisional application No. 63/038,442, filed on Jun. 12, 2020.

(51) Int. Cl.
*G06T 13/40* (2011.01)

(52) U.S. Cl.
CPC .................................... *G06T 13/40* (2013.01)

(58) Field of Classification Search
None
See application file for complete search history.

(56) References Cited

U.S. PATENT DOCUMENTS

| | | | | |
|---|---|---|---|---|
| 9,349,414 | B1 * | 5/2016 | Furment | H04N 23/611 |
| 9,697,635 | B2 | 7/2017 | Quinn et al. | |
| 10,671,838 | B1 * | 6/2020 | Bogan, III | G06T 11/60 |
| 10,872,451 | B2 | 12/2020 | Sheth et al. | |
| 2005/0042591 | A1 * | 2/2005 | Bloom | G11B 27/34 434/308 |
| 2013/0100140 | A1 * | 4/2013 | Ye | G06T 13/40 345/473 |

(Continued)

FOREIGN PATENT DOCUMENTS

KR 20130002367 A * 1/2013 ............. G06T 7/246

OTHER PUBLICATIONS

Chai, J. et al., "Vision-based Control of 3D Facial Animation", Eurographics/SIGGRAPH Symposium on Computer Animation (2003), 15 pages.

(Continued)

*Primary Examiner* — Aaron M Richer
(74) *Attorney, Agent, or Firm* — Dorsey & Whitney LLP

(57) ABSTRACT

Embodiments provide for improved capture and modification of sensor data. A first performance in a physical environment is recorded, and a first data object is generated, comprising at least a first motion capture element from the first performance, where the first motion capture element includes at least one of (i) body data or (ii) facial data. A request to modify the first data object based on a second data object including motion capture data from a second performance is received, and the first data object is modified by adding, to the first data object, a second motion capture element from the second data object. The modified first data object including the first motion capture element and the second motion capture element is outputted.

21 Claims, 10 Drawing Sheets

(56) References Cited

U.S. PATENT DOCUMENTS

| | | | | |
|---|---|---|---|---|
| 2013/0132835 | A1* | 5/2013 | Goldenberg | G06T 13/20<br>715/716 |
| 2014/0211037 | A1* | 7/2014 | Lee | H04N 23/80<br>348/222.1 |
| 2016/0336039 | A1* | 11/2016 | Leiberman | G11B 27/28 |
| 2017/0046865 | A1 | 2/2017 | Cantwell | |
| 2018/0053531 | A1 | 2/2018 | Wrzesinski | |
| 2018/0357472 | A1 | 12/2018 | Dreessen | |
| 2019/0107927 | A1* | 4/2019 | Schriber | G06F 40/205 |
| 2019/0206101 | A1* | 7/2019 | De la Torre | G06T 11/60 |
| 2020/0089954 | A1* | 3/2020 | Zia | G06V 20/64 |
| 2020/0111242 | A1* | 4/2020 | Gupta | G06T 11/00 |
| 2020/0126279 | A1* | 4/2020 | Nakao | G06T 11/60 |
| 2020/0183968 | A1 | 6/2020 | Breymann et al. | |
| 2020/0334853 | A1 | 10/2020 | Ciuc et al. | |

OTHER PUBLICATIONS

Kawaler, M. et al., "Database of speech and facial expressions recorded with optimized face motion capture settings", Journal of Intelligent Information Systems (2019) 53:381-404.

Damgrave, R.G.J., et al., "The Drift of the Xsens Moven Motion Capturing Suit during Common Movements in a Working Environment", Proceedings of the 19th CIRP Design Conference—Competitive Design, Cranfield University, Mar. 30-31, 2009, pp. 338.

Epic Games, Inc., "Unreal Engine 4.26 Documentation: Using Take Recorder", retrieved Mar. 23, 2021, 10 pages, <https://docs.unrealengine.com/4.26/en-US/AnimatingObjects/Sequencer/Workflow/TakeRecorder/UsingTR/>.

* cited by examiner

REAL-TIME ANIMATION MOTION CAPTURE

CROSS-REFERENCE TO RELATED APPLICATIONS

This application claims benefit of U.S. provisional patent application Ser. No. 63/038,442, filed Jun. 12, 2020 and is herein incorporated by reference in its entirety.

BACKGROUND

The present disclosure generally relates to motion capture, and more specifically, to improved techniques for capturing and manipulating motion capture data.

In animation production (including three-dimensional computer generated animations) for television, games, streaming media, and movies, various software is utilized in an animation pipeline beginning with concept and ending with a final animated product. Typically these systems utilize discrete pre-production and post-production elements, and lack significant interactivity between each step. For example, an artist may provide a storyboard or other notes to an animator to create an animation. Once the animation is completed, the original artist can suggest modifications or changes to preserve the original intent. Existing systems do not allow for efficient communication of these intents at the outset, which can introduce tremendous delay and waste. Existing systems are similarly unable to provide useful interactivity of the process, resulting in similar delay and wasted expense.

SUMMARY

Embodiments disclosed herein provide for improved collection and manipulation of motion capture data. A first performance in a physical environment is recorded, and a first data object is generated comprising at least a first motion capture element from the first performance, where the first motion capture element includes at least one of (i) body data or (ii) facial data. A request to modify the first data object based on a second data object including motion capture data from a second performance is received. The first data object is modified by adding, to the first data object, a second motion capture element from the second data object. The modified first data object including the first motion capture element and the second motion capture element is outputted.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; and a computer program product embodied on a computer readable storage medium comprising code for performing the aforementioned methods as well as those further described herein.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
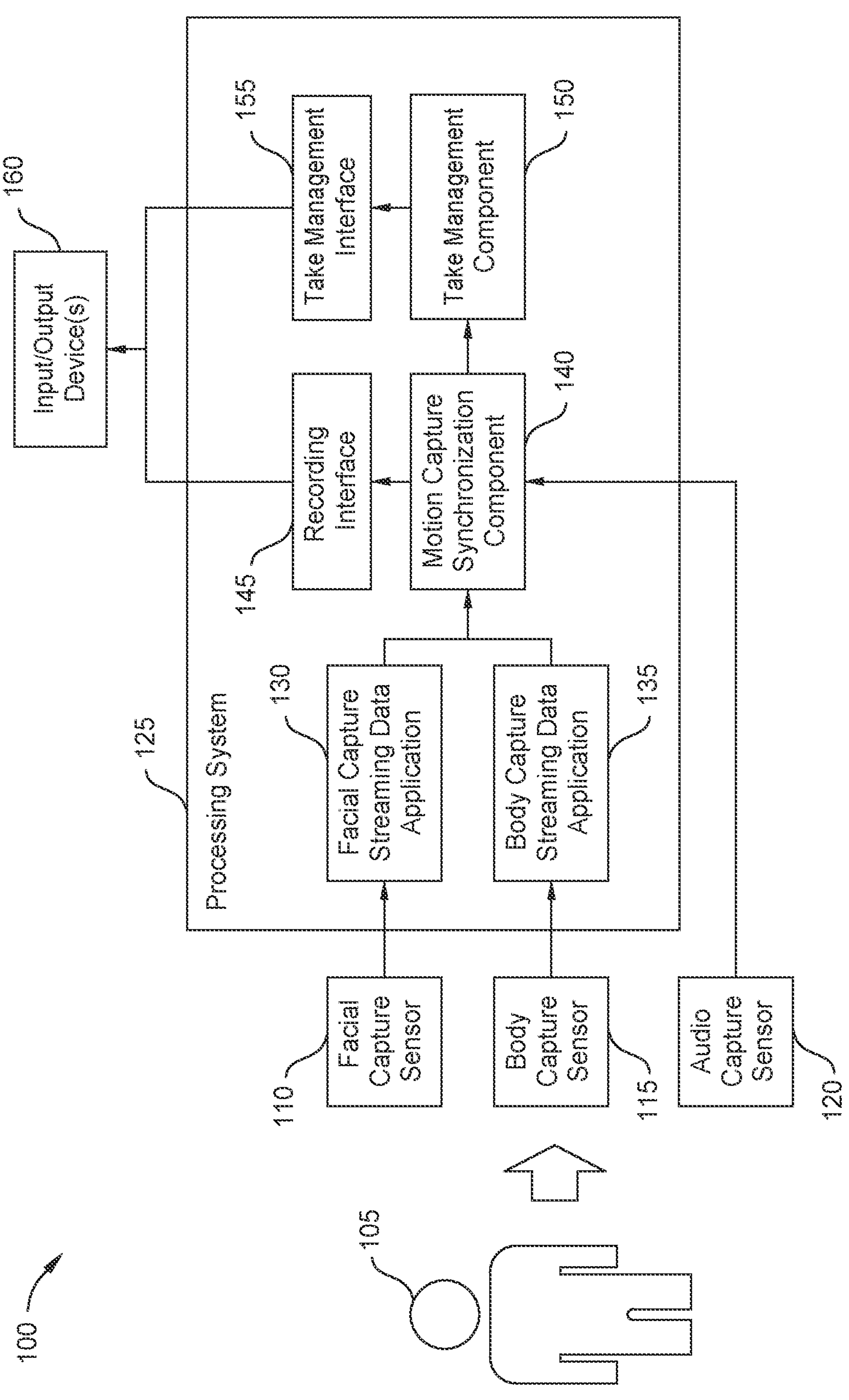
FIG. 1 depicts a system that captures and modifies motion capture data, according to some embodiments disclosed herein.

Embodiments of the present disclosure provide techniques for efficient integration of motion capture data into transformation systems to enable more fine-grained modification of animations. In an embodiment, motion capture data can be recorded for one or more performances or activities (e.g., actors and/or users moving and/or interacting with objects) in one or more physical environments. This motion capture data can then be stored using specialized data objects discussed below that facilitate storage, tracking, and manipulation of the data. For example, using techniques and structures described herein, motion capture data (as well as other captured data, such as audio, in some embodiments) from multiple distinct performances may be combined efficiently and easily to enable rapid and high-fidelity generation of computer animations.

In some embodiments, the system can be used to aid pre-visualization in animation production. For example, using techniques disclosed herein, more rich and detailed information may be generated and transmitted to animators, in order to efficiently convey artistic intent and reduce back-and-forth revisions. Some aspects of the disclosed workflow include consolidating aspects of the pre-production and post-production animation pipeline into a single real-time rendering engine. In some embodiments, a director or other artist or creator may utilize various embodiments disclosed herein to create approximations of the desired animations, which can then be sent to animators who create the animated performances based on this information. In other embodiments, the techniques described herein can be used to generate final animations based on the captured data.

Some embodiments disclosed herein provide systems and techniques to create dynamic three-dimensional animatics (e.g., preliminary versions of a movie, show or game, such as timed storyboards), which animator(s) can leverage to help guide the animation process. Existing systems are typically limited to providing animators with limited three-dimensional animatics (featuring static characters), two-dimensional drawings, and/or text, which causes creative intent (e.g., character expressions and movements) to be lost. In some embodiments of the present disclosure, by incorporating motion capture into the workflow, the improved system is able to prepare better approximations of the intended performance, which reduces iteration cycles (e.g., cycles of creation or revision of an animation, followed by review, and followed by subsequent revisions or changes to the animation) and makes production more efficient. Furthermore, because some embodiments of the present disclosure enable users to record facial, body, and audio performances simultaneously (as well as to mix recorded elements from different performances), the efficiency of the pipeline and the quality of the result can be significantly improved. Moreover, in some embodiments, the system captures such recordings in the environment(s) in which the characters will ultimately be depicted, and allows for flexible modifications and swaps of each recording. This improves the efficiency and decreases the costs of the process.

Generally, aspects of the present disclosure enable improved collection and modification of motion capture and other sensor data in way that reduces the computational and monetary expense of capturing and manipulating motion capture data, as well as improving the resulting renderings (due at least in part to the ease of modification and interactivity of the platform).

In some embodiments, a user can use the system to initiate recording of motion capture data or other sensor data from a space (e.g., a room or other physical space where users can move, speak, or otherwise act and perform). In some embodiments, the user can specify which types of data should be recorded, including body data (e.g., motion capture data relating to body movements, which may include head/neck movement, limb movement, trunk movement, and the like), facial data (e.g., motion capture data relating to facial expressions), and/or audio data. Once this data is recorded, in some embodiments, the system generates a unified data object referred to herein as a "take," which enables easy access and transformations on the data. Each take may generally include one or more segments of data (e.g., one or more frames of video data, facial data, body data, and/or audio data). In some embodiments, the user can place these takes on a timeline to easily identify segments which should be removed (e.g., all or a portion of a given recording), as well as segments of the recording that should be maintained.

In some embodiments, the system provides interfaces that allow users to readily manipulate the recorded takes. In various embodiments, these transformations can include modifying the length of each recording, selecting sub-ranges of each recording, and adjusting start and end times of each recording. In some embodiments, the system provides techniques to swap portions of each take with other takes, in order to generate unified take objects that best represent the artistic intent.

In some examples included in the present disclosure, Unity® is used as the real-time rendering engine. In embodiments, however, any other rendering engines can be used in accordance with the present disclosure.

FIG. 1 depicts a system 100 configured to enable improved capture and modification of motion capture data, according to some embodiments disclosed herein.

Although the depicted embodiment includes a number of discrete components, in embodiments, the components may be combined or distributed in any configuration, depending on the particular implementation. In the illustrated embodiment, a Facial Capture Sensor 110 and a Body Capture Sensor 115 are utilized to provide input data. Although depicted as discrete sensors for conceptual clarity, in embodiments, the Facial Capture Sensor 110 and Body Capture Sensor 115 (as well as other sensors) may be integrated or combined in a single device or sensor, or distributed across any number of devices or sensors. In some embodiments of the present disclosure, the facial capture sensor components include a camera to capture facial movements. In at least one embodiment, Faceware® motion capture technology is used, though other technology can readily be applied in accordance with the present disclosure. The facial capture sensor is generally configured to capture facial data of a User 105 (e.g., the features on an actor's face, as well as movement of those features). This facial data can include, for example, movement of the eyes, mouth, nose, cheeks, eyebrows, and other facial features.

In some embodiments, the facial data is captured and/or processed using a Facial Capture Streaming Data Application 130, which can utilize image data of the face to generate three-dimensional data about the facial features. In at least one embodiment, the Facial Capture Streaming Data Application 130 receives a stream of facial data in real-time (or near real-time) from the Facial Capture Sensor 110. In some aspects, users may optionally record the image/video data using a digital recorder device or component.

In the illustrated embodiment, the body data collected via the Body Capture Sensor 115 can be similarly collected and/or processed by a Body Capture Streaming Data Application 135. Although depicted as discrete applications for conceptual clarity, in embodiments, the Facial Capture Streaming Data Application 130 and Body Capture Streaming Data Application 135 may be integrated or combined in a single application. In some embodiments of the present disclosure, the body capture sensor components can include a camera to capture body movements. In some embodiments, the body capture sensor components can include one or more inertial measurement units (IMUs) (e.g., including one or more of a gyroscope, a magnetometer, or an accelerometer). In at least one embodiment, Xsens® motion capture technology is used, though other technology can readily be applied in accordance with the present disclosure. In an embodiment, this body data can include three-dimensional detail relating to movement of the body, such as the actor's location in the environment, movement of each limb, and the like.

Further, in the illustrated example, an Audio Capture Sensor 120 (e.g., a microphone) may be utilized to capture audio in the environment (e.g., sound effects, or monologue or dialogue from one or more actors). This can allow the system to provide actual audio of the performance, in addition to motion capture data of the performance.

Although the illustrated system includes a Facial Capture Sensor 110, Body Capture Sensor 115, and Audio Capture Sensor 120, the particular sensors used in a given system may vary depending on the particular implementation. For example, in one embodiment, a Facial Capture Sensor 110 and/or Audio Capture Sensor 120 may be used to collect motion capture data and/or audio data while a first User 105 (e.g., a voice actor) provides a performance. Separately, a Body Capture Sensor 115 may be used to collect motion capture data for a second User 105 acting as the body actor. Using aspects of the present disclosure, the motion capture data from each performance can be seamlessly combined.

Additionally, in some embodiments, other sensors may be utilized. For example, in one such embodiment, a sensor (such as a camera) may be used to track the location of objects (such as props, cameras, and the like) in the physical space. This motion capture data can similarly be ingested by the Processing System 125.

In some embodiments, these recordings are maintained using a unified data object referred to as a "take" or "take object" that stores various data relating to a particular performance. By recording and manipulating these takes, the Processing System 125 allows users to efficiently design the production.

In one embodiment, a "take" can generally include body data relating to the movement and/or location of the body of a character (e.g., three-dimensional positions, rotations, and/or movement of various elements of the body, captured using body motion capture), facial data relating to expressions and facial features of the character (e.g., three-dimensional positions, rotations, and/or movement of various facial elements captured using facial motion capture), audio data (which may include audio captured in the environment as the body and/or facial data are captured, and/or pre-prepared audio, such as character monologue or dialogue and sound effects), and the like. In some embodiments, a take can include motion capture data for multiple elements in the space (e.g., multiple actors, multiple objects, a mix of actor(s) and object(s), and the like).

In some embodiments, the data from each sensor is collected and synchronized by a Motion Capture Synchronization Component 140 in order to generate a unified data object that includes each recording. In embodiments, the operations of the Motion Capture Synchronization Component 140 may be implemented via hardware, software, or a combination of hardware and software.

In the illustrated embodiment, the Processing System 125 further includes a variety of components (including a Recording Interface 145 and a Take Management Interface 155) to facilitate the creation and management of takes. For example, a user or operator may use various Input/Output Devices 160 (e.g., a keyboard, a mouse, a microphone, a touchscreen, etc.) to initiate, pause, and stop collection of data from the various sensor devices via the Recording Interface 145. Further, using the Take Management Interface 155, the user or operator can retrieve, modify and manipulate, tag, comment on, store, or otherwise interact with the take objects. In the illustrated embodiment, the Take Management Component 150 can manage the underlying data while the Take Management Interface 155 provides an easily-readable and usable interface to do so. In some embodiments, a separate operator may interact with the Processing System 125 (e.g., to control the recording process) while the User 105 provides the performance. In some embodiments, a single User 105 may act as both the performer and the operator.

In some embodiments, as data is received from the various sensors, the data is recorded and displayed in real-time (or near real-time), which allows for immediate adjustments in order to ensure creative intent is maintained. For example, in some embodiments, operators can dynamically modify scene lighting, the location or size of physical or virtual objects in the scene, and the like. Advantageously, such a real-time rendering platform allows the actor to modify her performance while the user modifies the scene, in order to ensure the result aligns with the creative intent.

Although the illustrated embodiment includes body, facial, and/or audio input data, in various embodiments, any number and variety of input data may be utilized. In some embodiments, any type of data can be streamlined into the system and recorded, such that it can be included in "takes" and managed using embodiments described herein. As one example, in some embodiments, data related to camera movement and/or location can be captured. For example, an operator may move a physical object, which may be an actual device with a camera or a simple viewport with a positional sensor, around in the real-world space. This operator may use the device to film (or simulate filming) the motion capture actor(s), and the position and/or rotation of the object can be recorded by the system. The movement of this object in the physical environment can then be included as part of one or more takes, in order to modify data objects in the virtual scene (e.g., used to drive a virtual camera performance/movement within the real-time rendering engine). In some embodiments, the system has such multi-input recording capabilities and any form of real-time data could be captured.

Figure 2:
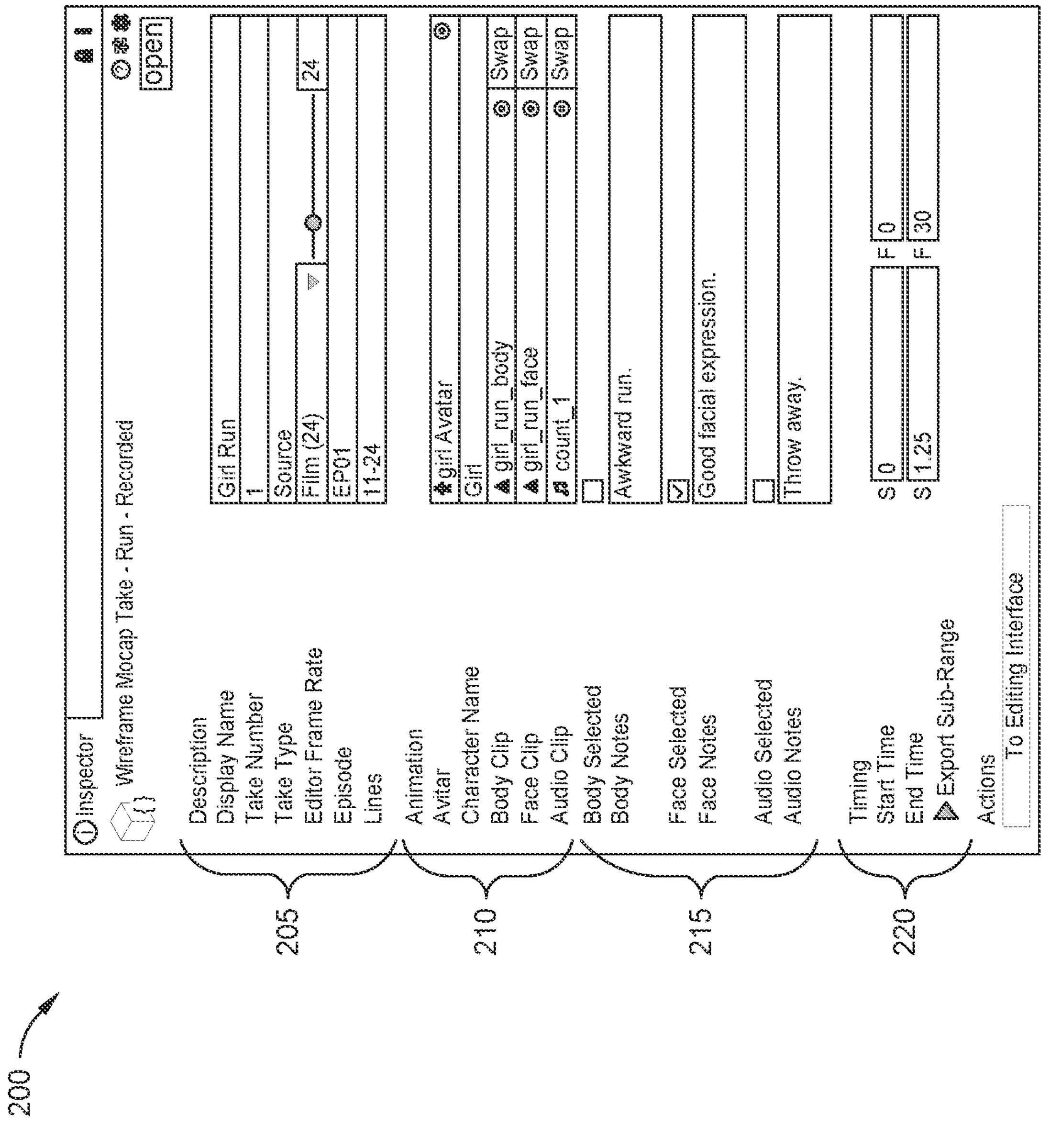
FIG. 2 depicts an example interface for interacting with a data object to capture and modify motion capture data, according to some embodiments disclosed herein.

FIG. 2 depicts an example Interface 200 for interacting with a data object to enable improved capture and modification of motion capture data, according to some embodiments disclosed herein. In the illustrated example, the Interface 200 provides details and data relating to a take object.

In the illustrated example, each data object (which may be referred to as a take or a take object, as discussed above) can be associated with a variety of parameters or values, as illustrated via the Interface 200. Specifically, in the illustrated example, the take object has a first set of Parameters 205 related to identifying the take, a second set of Parameters 210 related to the contents of the take (e.g., links or pointers to the relevant motion capture data), a third set of Parameters 215 that can be used to indicate which elements of the data are selected or in use for the take (e.g., whether the facial data, body data, and/or audio data are selected), and a fourth set of Parameters 220 relating to the timing of the take (e.g., the start and end time or frames). Although the illustrated example includes discrete sets of parameters for conceptual clarity and ease of reference, the illustrated parameters may be grouped or arranged in any manner. Further, in various embodiments, one or more of the illustrated parameters may be omitted, and/or additional parameters not pictured in the illustrated example may be included.

As indicated in the first set of Parameters 205, in an embodiment, each "take" can be associated with a user-readable displayed name, which a user may set. In the illustrated example, the display name is "Girl Run." In some embodiments, each take object further includes a "take number" (e.g., a version number) indicating when the take was captured and/or the order in which multiple takes were captured (e.g., whether it was the first take or tenth take, and/or the date/time when the take was captured).

In the illustrated embodiment, the "Take Type" may generally refer to the type or category of the take. For example, a "source" take type generally includes captured body data, facial data, and/or audio data collected at one time from a single performance (e.g., in a single take). A hybrid type (also referred to as a "mix and match" type in some aspects) generally includes captured body, facial data, and/or audio data that has been collected at different times (e.g., over the course of multiple takes or performances). This allows users to separate and recombine data from different performances into a single take object. For example, body data from Take 1, facial data from Take 3, and audio data from Take 2, to form a new "mix and match" type take (e.g., mix and match Take 1). This granular control of the data contained in each take object enables users to dynamically and efficiently manage a wide variety of data.

As illustrated in the portion of the Interface 200 that includes the second set of Parameters 210, various animation variables can be provided, which can include elements such as which avatar is associated with the take (e.g., which three-dimensional model or character). In the illustrated example, the avatar is "girlAvatar." Similarly, the user may specify a name for the character ("Girl", in the illustrated embodiment).

Additionally, in some embodiments, the second set of Parameters 210 can include an indication of the relevant data (e.g., audio data and/or motion capture data such as body data or facial data) associated with the take object. For example, the second set of Parameters 210 may include pointers to the relevant data. In the illustrated example, the take object includes "girl_run_body" motion capture data for the body data, "girl_run_face" for the facial data, and "count_1" for the audio data.

In the illustrated example, the user can selectively swap elements of the take object (e.g., the facial data, body data, and/or audio data) for other elements of motion capture or audio data associated with other takes, by using the "swap" element. In some embodiments, upon selecting the "swap" input, the system can identify other take objects that can be used to supplement or replace the element(s) of the current take object, and present these options to the user. For example, the system may identify other take objects that are also associated with the "girlAvatar," and allow the user to select among them.

In the portion of the Interface 200 relating to the third set of Parameters 215, the user can selectively choose to include or exclude each element of the capture data (indicated by the "Body Selected," "Face Selected," and "Audio Selected" options). In some embodiments, the "selected" parameter(s) are used for tracking purposes to indicate or denote which aspects of the take are approved, accepted, or otherwise selected (e.g., by a director). In at least one embodiment, if a given element is not selected, it will not be included when the user moves the take object to the timeline for visualization and/or manipulation.

As further illustrated, the user can associate each element with tags or notes including a natural language description of each element, allowing users to easily evaluate and identify takes (and take elements). For example, the body element has been labeled as "Awkward run" and the facial element has been labeled as "Good facial expression." These tags can facilitate subsequent modifications and manipulations of the take objects. For example, the user can quickly determine that the body data should be replaced or not selected (based on the tag). Further, upon requesting to swap the body element, the system can present not only the possible replacements, but also the associated tags with each. This can allow the user to quickly identify quality elements.

In some embodiments, a number of operations and actions can also be used to modify and manipulate take objects. For example, as illustrated, the fourth set of Parameters 220 may specify the start and end times and/or first and last frames of the current take object, and users may dynamically select sub-ranges in order to create a new take object (e.g., via the "export sub-range" element) that includes only the selected sub-range of times and/or frames. Notably, in some embodiments, these ranges can be utilized to select portions of the body data, facial data, and/or audio data separately for a single take. For example, suppose a given take object includes ten seconds of body recording, ten seconds of facial recording, and ten seconds of audio recording. In some embodiments, the user can select different sub-ranges for each recording (e.g., the first four seconds of facial data, the middle eight seconds of body data, and none of the audio data) to export to a new take object.

In the illustrated example, the Interface 200 also includes a "To Editing Interface" Element 225 that allows the user to move the take object (or elements thereof) to another interface (e.g., a timeline) that allows the take object to be manipulated and visually observed in the context of the full scene. For example, the user may move a take object to a timeline that allows the user to align the motion capture data and/or audio data with other elements in a three-dimensional scene (e.g., other characters, environmental elements, and the like).

In some embodiments, the system can easily retrieve and depict a list of take objects available. In some embodiments, users may search for or filter the set of takes based on the character/avatar they wish to see. This allows users to quickly retrieve and utilize a number of takes for the same character. In some embodiments, the displayed list can generally indicate one or more of the take name/number, the character, the type of data contained therein (e.g., facial, body, or audio), the start time and first frame of the take, the end time and last frame of the take, a pointer to the underlying data, an indication of the episode the take corresponds to, an indication of the line(s) in the episode to which the take corresponds, an indication as to whether the particular take or sub-element is selected for use, or other notes associated with each take. Additionally, in some embodiments, users can export their search or filtered list of takes (such as into a .CSV format). Such exports can be used to provide data to producers or other entities (e.g., other production team members) for a variety of other production-related purposes.

Figure 3:
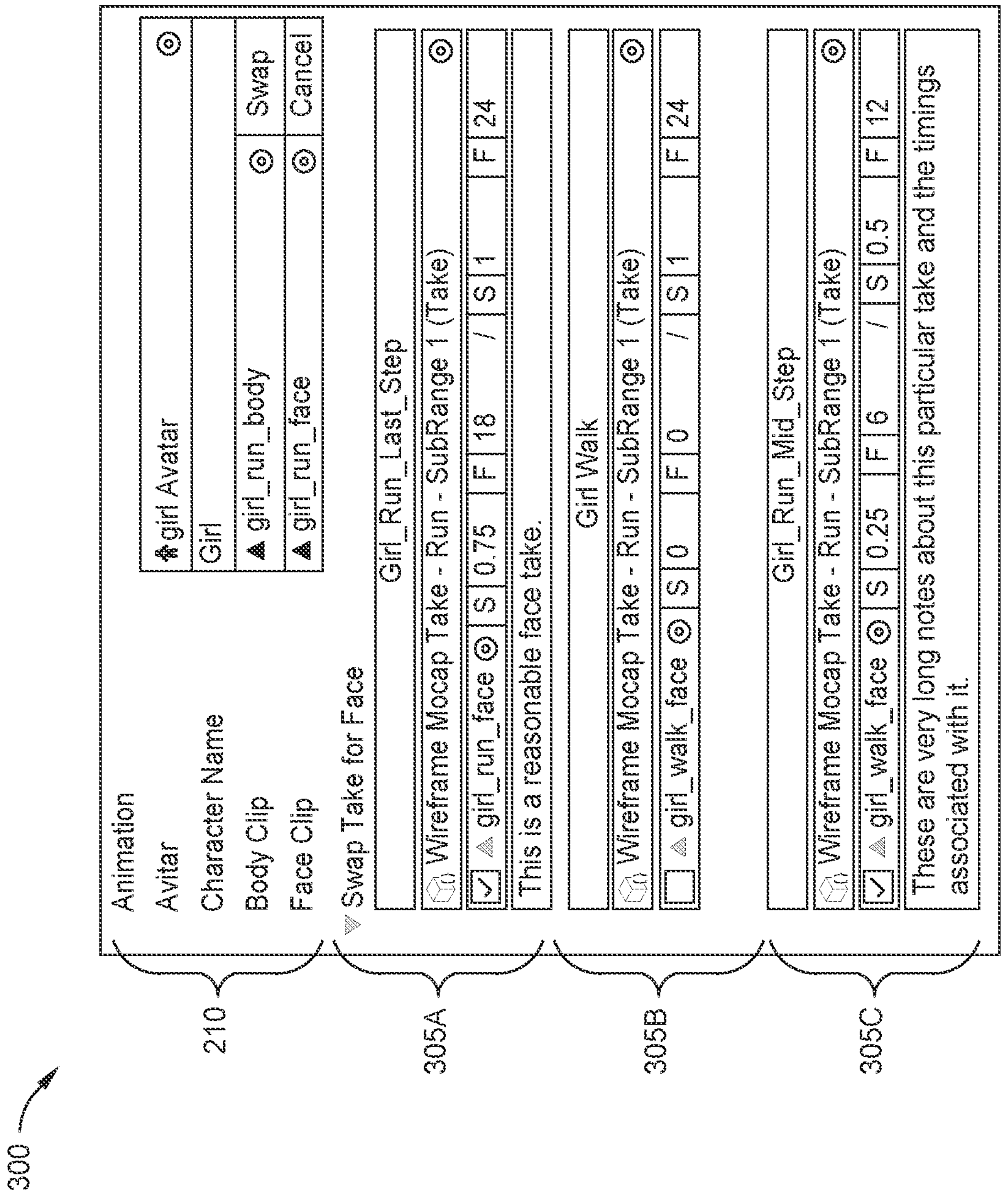
FIG. 3 depicts an example graphical user interface (GUI) to modify motion capture data, according to some embodiments disclosed herein.

FIG. 3 depicts an example graphical user interface (GUI) to enable improved modification of motion capture data, according to some embodiments disclosed herein. Specifically, the Interface 300 may be presented when a user requests to swap, supplement, or otherwise modify the data elements associated with a given take object.

In the illustrated example, the user has requested to swap the facial motion capture data of the take object depicted in FIG. 2 with facial motion capture data from a different take. As illustrated, the system has identified three other take objects (depicted in Sections 305A-305C) that can be used to supplement or replace data elements in the currently-selected object.

In some embodiments, as discussed above, the system identifies other take objects associated with the same avatar when identifying alternative elements. In at least one embodiment, other filtering rules may be selectively applied (e.g., at the request of the user), such as filtering to include only take objects associated with the same episode number, the same lines in the script, takes specifying the same character name, and the like.

As illustrated, each alternative take object can be presented with a display name ("Girl Run Last Step," "Girl Walk," and "Girl Walk Mid-Step" in the illustrated example), allowing the user to quickly evaluate each.

Additionally, in the illustrated embodiment, the Interface 300 can depict a variety of data about each alternative, including the display name, the length, the beginning/end frames, and user-provided notes about the take. In the illustrated example, because the user has requested to swap the facial data, the system has retrieved and displayed the user-generated tags associated with each element of facial data included in each alternative take object. This allows the user to quickly determine which alternative element should be added.

Figure 4A:
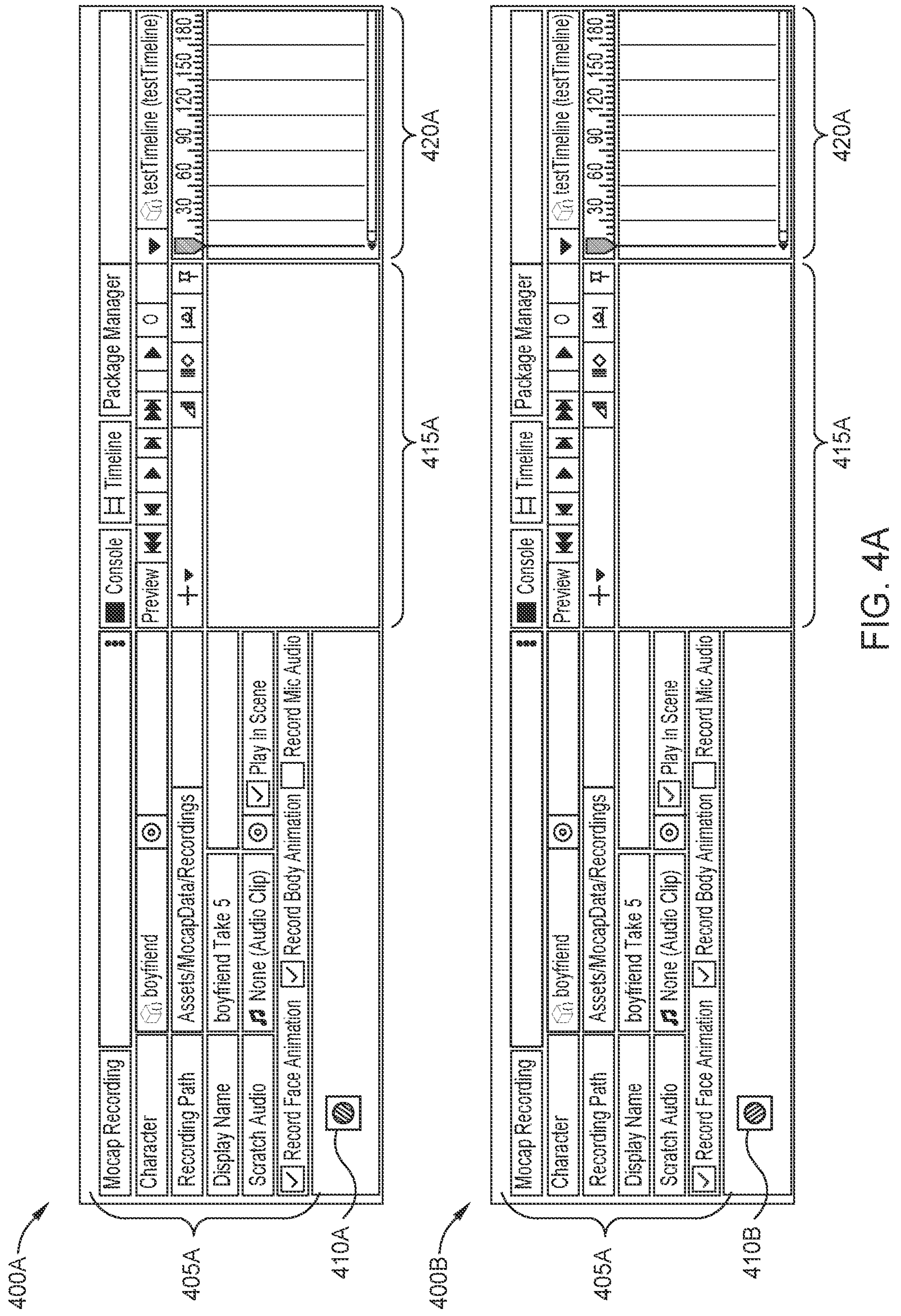
FIG. 4A depicts an example workflow for capturing motion capture data, according to some embodiments disclosed herein.
Figure 4B:
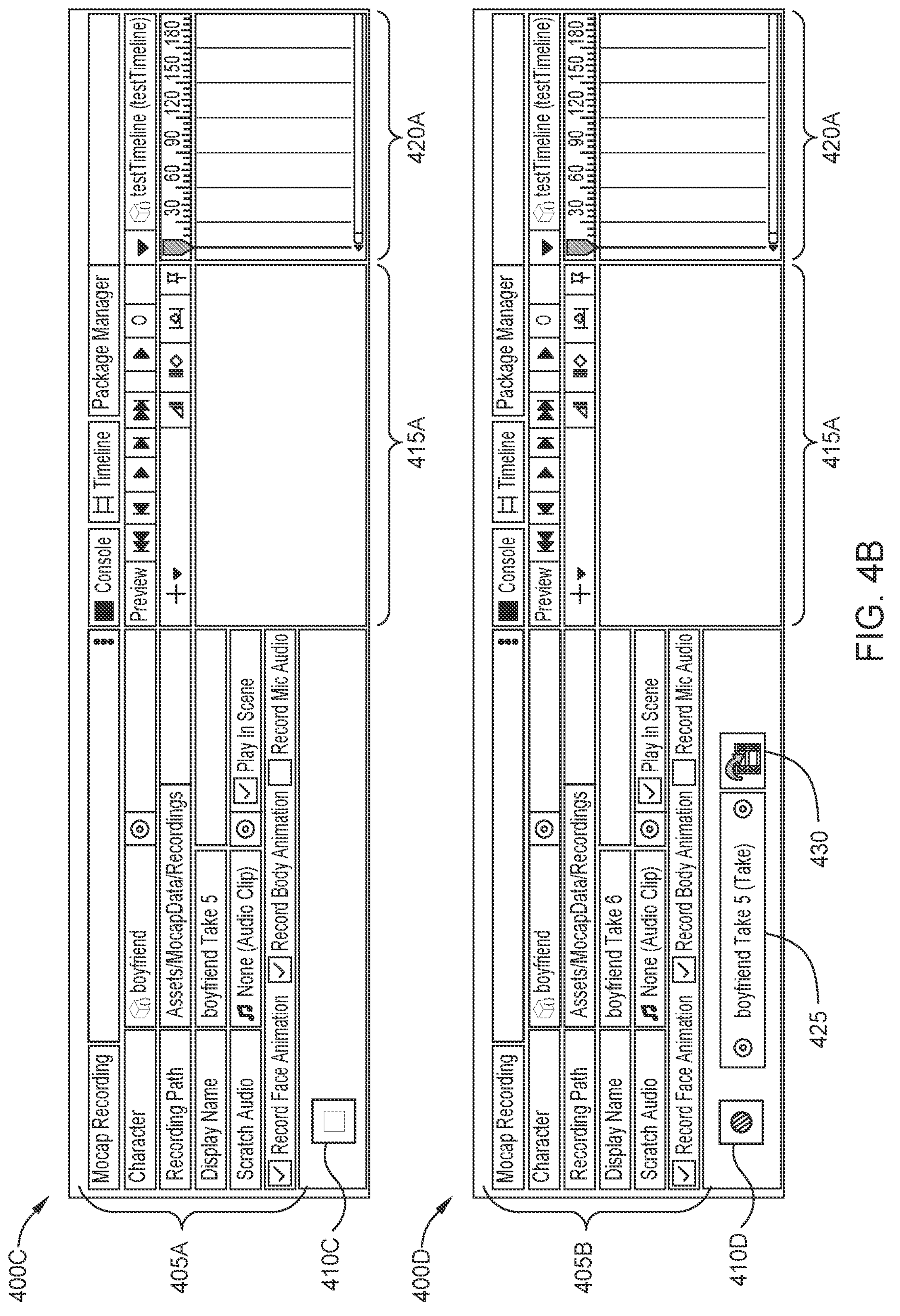
FIG. 4B depicts an example workflow for capturing and interacting with motion capture data, according to some embodiments disclosed herein.
Figure 4C:
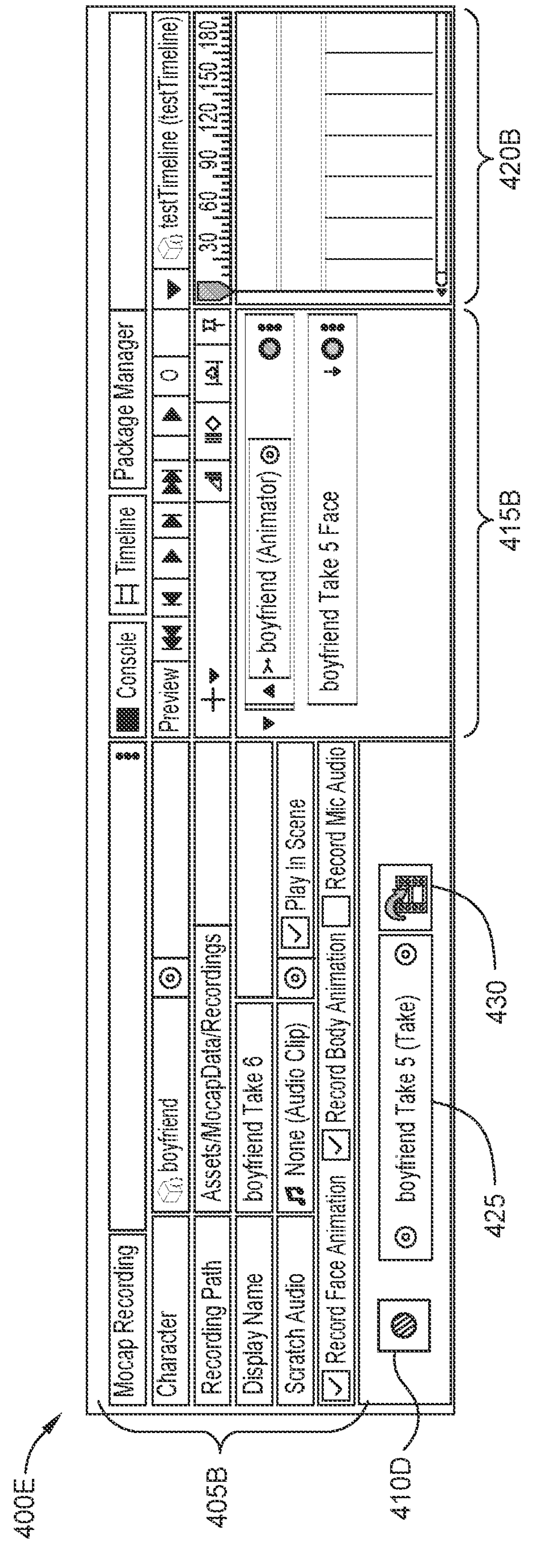
FIG. 4C depicts an example workflow for capturing and interacting with motion capture data, according to some embodiments disclosed herein.

FIGS. 4A-4C depict an example workflow 400 for capturing and modifying motion capture data, according to some embodiments disclosed herein.

As illustrated in FIG. 4A, the Interface 400A includes a Section 405A that allows the user to select or define various aspects of the recording, which can be used to define the resulting take object. For example, the system can allow the user to select or provide an indication of the character for which the recorded data should be used (e.g., the avatar). For example, in the illustrated example, the performance (that will be recorded) is intended for a "boyfriend" character in a particular show or movie. In response, the system (e.g., System 100) may retrieve a computer-readable representation of the appropriate character rig (e.g., the three-dimensional character model, along with a skeletal or bone structure used to define the character movement).

Further, the user can select a recording path (allowing the user to define where the captured sensor data will be stored) and a display name for the take object. In the depicted example, the user can also pre-select audio for the take object, as well as select whether to output the audio in the physical environment during the recording. For example, suppose audio data (e.g., sound effects and/or dialogue) has been pre-recorded. In the illustrated example, the audio data can be output it into the space during recording (e.g., via a speaker), allowing the performers to synchronize their movements to the intended audio.

Additionally, in the illustrated embodiment, the user can select which sensor data will be recorded as part of the take object. The illustrated example includes an option to record facial motion capture data, body motion capture data, video data (e.g., a flat or two-dimensional video recording of the scene, as opposed to three-dimensional motion capture data), and audio data. In various embodiments, other sensor data can also be selectively recorded (such as location and/or movement data for one or more physical objects in the space).

Additionally, in the illustrated embodiment, the Interface 400A also includes a Section 415A that will provide more detail for the take object(s) as they are recorded, and a Timeline 420A. The Timeline 420A is generally a graphical representation of time as a line, allowing users to arrange take objects (or elements therefrom) chronologically and to synchronize the objects (or elements) with each other, as well as with any other relevant events (such as other motion or audio in the three-dimensional rendered scene).

The Interface 400A further includes a Button 410A that can be selected to initiate capturing of sensor data in the space. In some embodiments, the Button 410A can indicate whether any required fields have been entered (e.g., identifying the character and recording path) and the system is prepared to enter the recording phase. For example, the Button 410A may become a green circle when the system is prepared. To transition to the next stage, the user can click or otherwise select this Button 410A.

As illustrated by Interface 400B, when the user selects the Button 410A, the attributes included in Section 405A may be optionally locked, and the system is "armed" for recording. Further, upon clicking or otherwise selecting the Button 410B, capturing of the indicated sensor data begins.

As illustrated in FIG. 4B, the Interface 400C is presented while the sensor data is captured. In embodiments, during the recording, the system captures and records the indicated motion capture data, which can include body data, facial data and/or audio data, depending on the implementation and selections of the user. In some embodiments, by checking the "Record Video" box, the user can similarly instruct the system to record raw video from the facial capture sensor device and/or body capture device. Similarly, in some embodiments, by checking the "Record Mic Audio" box, the user can also instruct the system to record audio from the environment. As illustrated, when recording is ongoing, a Button 410C is presented. This element may allow the user to stop the recording of sensor data.

Upon clicking or otherwise selecting the Button 410C to stop recording, the system can save the recorded take. As depicted in Interface 400D, once the system has finished saving the prior take object, the user can begin immediately recording the next take if desired (e.g., by selecting the Button 410D). In the illustrated embodiment, the display name has automatically incremented (from "boyfriend Take 5" to boyfriend Take 6"). This allows users to quickly and easily record a number of takes sequentially, in order to ensure adequate data is collected. Notably, in some embodiments, the take objects are recorded and stored but are not yet pushed to the Timeline 420A or otherwise presented for editing. As depicted, the Section 425 can indicate that the recorded take object is complete, and the Section 430 can be used to move the data elements to the Timeline 420A.

As depicted in the Interface 400E in FIG. 4C, when the user selects the "to timeline" Button 430, the details about the take object are placed in the Section 415B, and the recorded sensor data is displayed on the Timeline 420B for modification, as discussed above. For example, in some embodiments, the user may scrub a cursor along the Timeline 420B to view various portions of the recording. In some embodiments, as the user scrubs through the Timeline 420B, the recorded data may be output for display. That is, the user can view the recorded motion capture data associated with the take object. Similarly, by clicking the "play" button, the user can view the take in real-time.

In some embodiments, the Timeline 420B indicates the individual recorded sensor data (e.g., facial, body, and audio) as well as the length of each and the position on the timeline. This recorded data may begin at the same time and end at the same time, initially. In some embodiments, however, the recordings may have different time durations, and/or be staggered or offset (e.g., the face recording may begin later than the body recording).

In some aspects, the user may use the Timeline 420B to align the recorded sensor data with other recordings or events. Additionally, in some embodiments, the user can split the recorded data into multiple sub-ranges using the Timeline 420B. This can allow the user to delete portions of the recording as desired (e.g., frames 0 through 67), and/or re-align the recorded data with the beginning of the timeline or with other events or data. This allows the user to easily modify and manipulate recorded takes using the timeline, in order to generate better takes that can be used to drive the production process.

Figure 5:
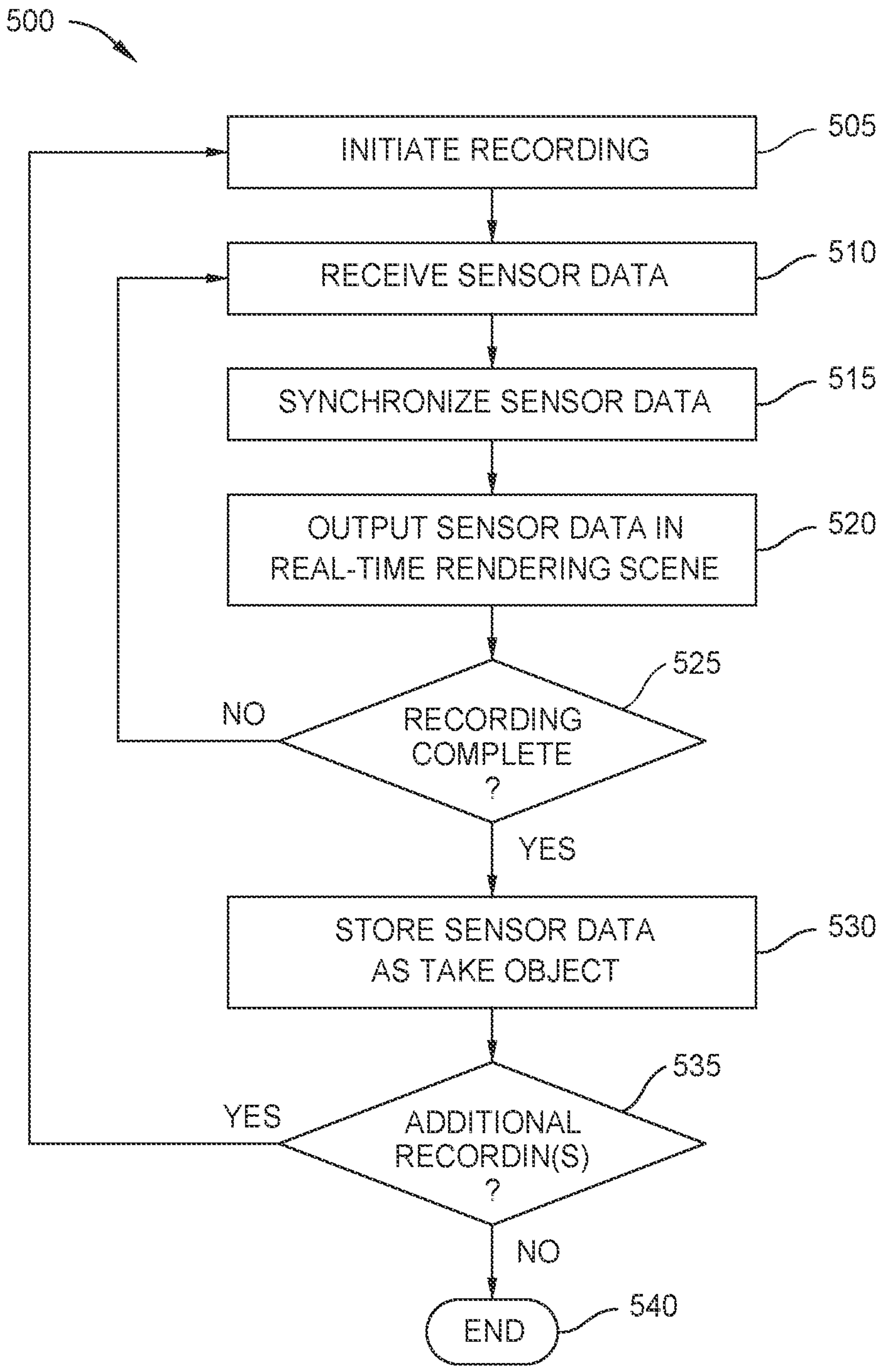
FIG. 5 is a flow diagram for collecting and storing motion capture data, according to some embodiments disclosed herein.

FIG. 5 is a flow diagram illustrating a method 500 for collecting and storing motion capture data, according to some embodiments disclosed herein. The method 500 begins at block 505, where a recording of sensor data is initiated (e.g., by a processing system, such as Processing System 125 in FIG. 1).

At block 510, the processing system receives sensor data as it is recorded in real-time (or near real-time). In some embodiments, the processing system may selectively record or capture the sensor data based on its configuration (e.g., based on which elements of data the user wishes to record). The sensor data can generally include a wide variety of data, including motion capture data for a performer's face and/or body, motion capture data for objects or elements in the physical space, audio data, video data, and the like.

The method 500 then continues to block 515, where the processing system synchronizes the received sensor data. In some embodiments, as the sensor data is received from different devices and components, there may be some misalignment in the data (e.g., one source of data may have additional latency in the processing or transfer of the data). In an embodiment, therefore, the processing system can buffer and synchronize the received data (e.g., based on predefined offsets) to ensure that the resulting take object is accurate and ready for manipulation. In some embodiments, the processing system can align the data once the recording is complete. In embodiments, if only a single type of data is being recorded, the synchronization step may be omitted.

At block 520, the processing system can optionally output the sensor data in a real-time rendering scene. For example, the processing system may display the motion capture data in real-time (or near real-time) in the context of a three-dimensional scene. This can allow users or operators to dynamically modify the scene, such as by instructing the actors, or changing the scene lighting, the location or size of physical or virtual objects in the scene, and the like.

At block 525, the processing system determines whether the recording is complete. This may include, for example, determining whether the user has stopped the recording. If the recording is not complete, the method 500 returns to block 510 to continue receiving sensor data. If the recording is complete, the method 500 continues to block 530.

At block 530, the processing system stores the sensor data in a unified take object, as discussed above. This may include, for example, labeling the recorded sensor data collectively with a display name, relevant avatar, and other information such as described above.

At block 535, the processing system determines whether additional recording(s) are initiated or desired. For example, as discussed above, the user may immediately initiate another recording after finishing the first recording. If an additional recording has been initiated (block 505), the method 500 returns to block 510. If the recording has completed, the method 500 terminates at block 540.

Figure 6:
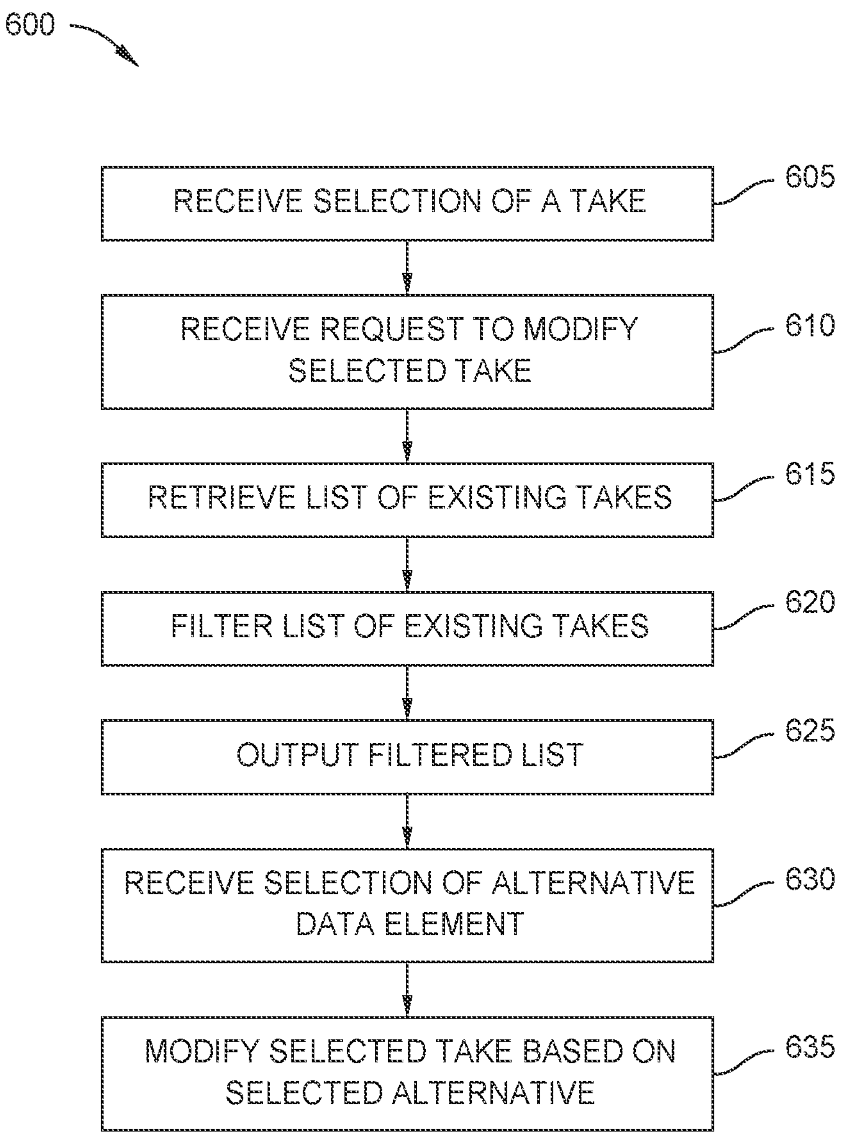
FIG. 6 is a flow diagram for modifying motion capture data, according to some embodiments disclosed herein.

FIG. 6 is a flow diagram illustrating a method 600 for modifying motion capture data, according to some embodiments disclosed herein. In some embodiments, the method 600 can be used to modify and manipulate take objects after they have been recorded and stored using, e.g., the method illustrated in FIG. 5.

The method 600 begins at block 605, where the processing system receives a selection of a take object. This selection may be received, for example, from a user. In one aspect, selecting the take object causes the processing system to output relevant information, such as the name, avatar and/or character, episode, length, associated data elements and tags, and the like.

At block 610, the processing system receives a request to modify the selected take object. As discussed above, the user may augment or supplement the selected take object with a data element from another take object (e.g., by replacing an existing element, or by adding an element that was not recorded for the selected take object). For example, an operator or user may cause the processing system to generate a take object including facial motion capture data and/or audio data from a voice and/or face actor, as well as a take object including body data from a body actor. Subsequently, a user may augment the take object including the body data using the take object including the facial and/or voice data (or vice versa).

The method 600 then continues to block 615, where the processing system retrieves a list of existing takes available. In some embodiments, the processing system can identify all of the available takes. In other embodiments, the processing system may identify available takes within a defined storage region (e.g., a region associated with the particular episode, character, or other characteristic of the selected take object).

At block 620, the processing system optionally filters the list of existing takes based on various criteria. In some embodiments, this criteria may be specified by the user. For example, in various embodiments, the processing system may filter the take objects to identify alternative take objects that correspond to the same avatar or character, the same episode and/or line number, and the like. At block 625, the processing system can output this filtered list for selection.

The method 600 then continues to block 630, where the processing system receives a selection of an alternative data in one of the presented alternative take objects. For example, as discussed above with reference to FIG. 3, the user may select the facial data from a second take object in order to replace facial data of a first take object (or to provide facial data, if the first take object does not include this element of data).

At block 635, the processing system modifies the selected take object based on the selected alternative data element. This may include, for example, updating the pointer(s) in the selected take object, such that the selected take object indicates the appropriate data element(s).

Figure 7:
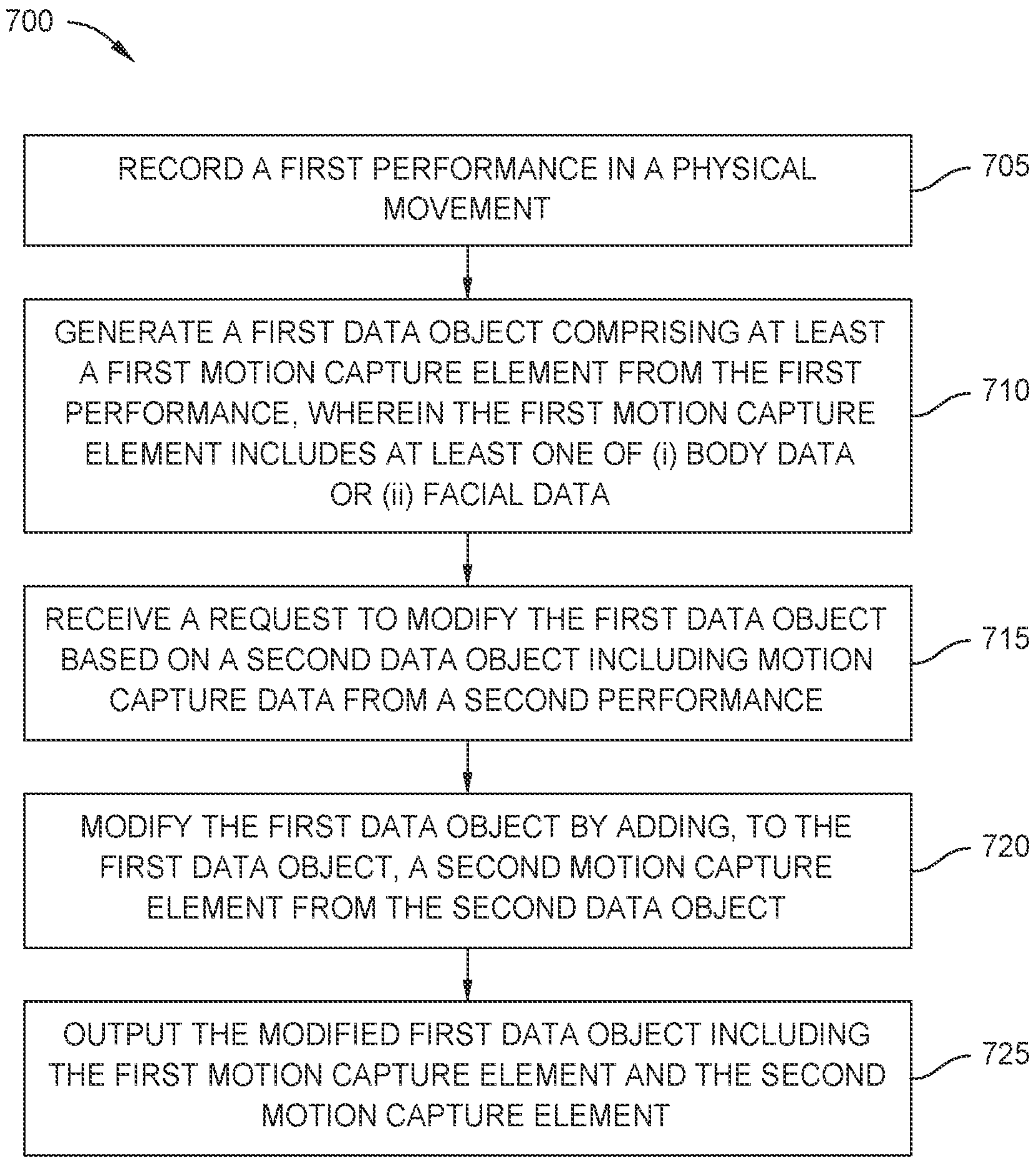
FIG. 7 is a flow diagram for motion capture data modification, according to some embodiments disclosed herein.

FIG. 7 is a flow diagram illustrating a method 700 for improved motion capture data modification, according to some embodiments disclosed herein.

The method 700 begins at block 705, where a processing system (e.g., the processing system in FIG. 1) records a first performance in a physical environment.

At block 710, the processing system generates a first data object (e.g., a take object discussed above) comprising at least a first motion capture element from the first performance, wherein the first motion capture element includes at least one of (i) body data or (ii) facial data.

At block 715, the processing system receives a request to modify the first data object based on a second data object (e.g., a different take object) including motion capture data from a second performance. The second performance may have been captured at a different time or place than the first performance.

At block 720, the processing system modifies the first data object by adding, to the first data object, a second motion capture element (e.g., body data or facial data) from the second data object.

At block 725, the processing system outputs the modified first data object including the first motion capture element and the second motion capture element.

Figure 8:
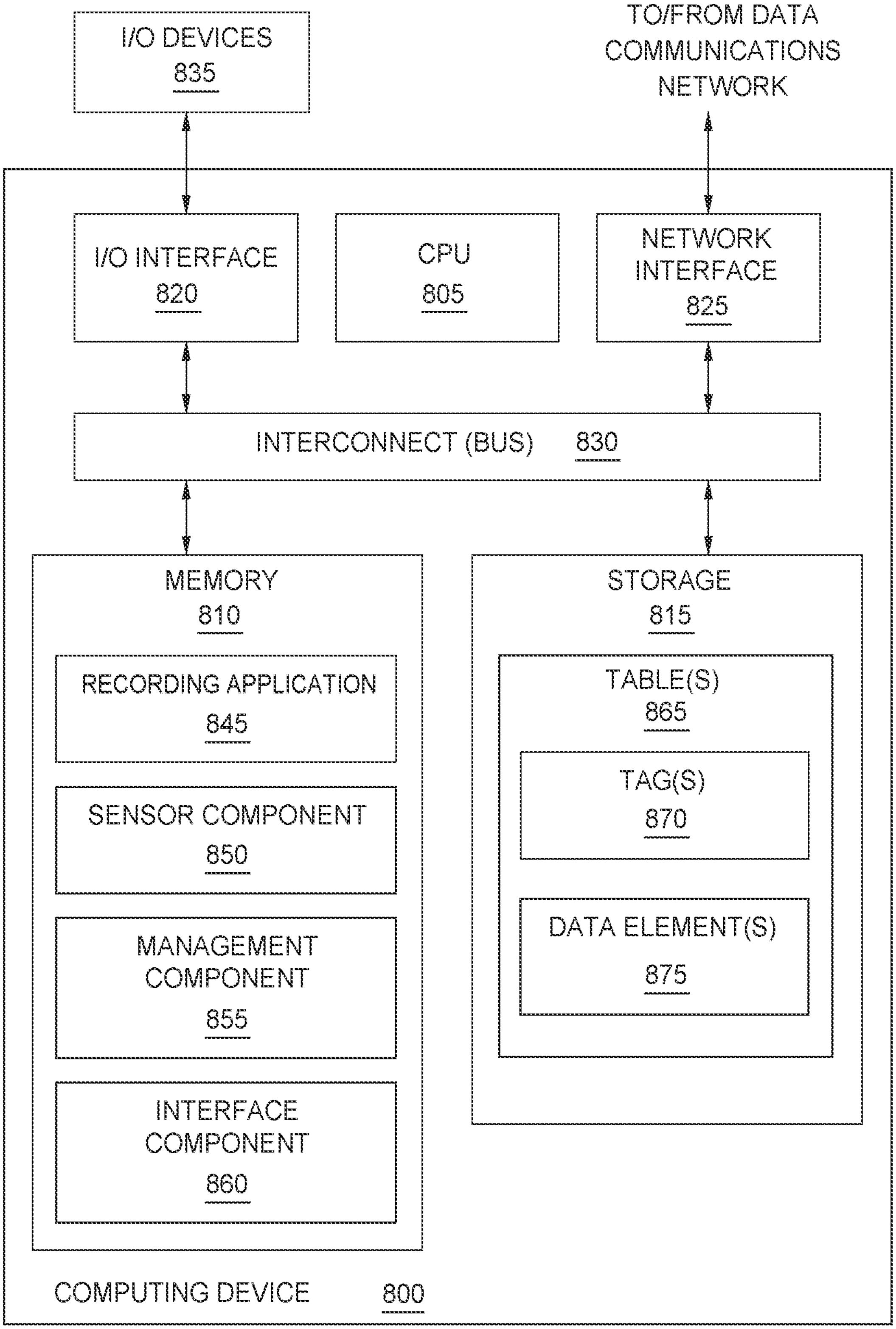
FIG. 8 is a block diagram illustrating a computing device that captures and modifies motion capture data, according to some embodiments disclosed herein.

FIG. 8 is a block diagram illustrating a Computing Device 800 configured to enable improved capture and modification of motion capture data, according to some embodiments disclosed herein.

Although depicted as a physical device, in embodiments, the Computing Device 800 may be implemented using virtual device(s), and/or across a number of devices (e.g., in a cloud environment). In one embodiment, the Computing Device 800 corresponds to the Processing System 125 in FIG. 1. As illustrated, the Computing Device 800 includes a CPU 805, Memory 810, Storage 815, a Network Interface 825, and one or more I/O Interfaces 820. In the illustrated embodiment, the CPU 805 retrieves and executes programming instructions stored in Memory 810, as well as stores and retrieves application data residing in Storage 815. The CPU 805 is generally representative of a single CPU and/or GPU, multiple CPUs and/or GPUs, a single CPU and/or GPU having multiple processing cores, and the like. The Memory 810 is generally included to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 835 (such as keyboards, monitors, etc.) are connected via the I/O Interface(s) 820. In one embodiment, I/O Devices 835 correspond to the Input/Output Devices 160 in FIG. 1. In some embodiments, the I/O Devices 835 may also include sensors (such as the Facial Capture Sensor 110, Body Capture Sensor 115, and/or Audio Capture Sensor 120 in FIG. 1). Further, via the Network Interface 825, the Computing Device 800 can be communicatively coupled with one or more other devices and components (e.g., via a network, which may include the Internet, local network(s), and the like). As illustrated, the CPU 805, Memory 810, Storage 815, Network Interface(s) 825, and I/O Interface(s) 820 are communicatively coupled by one or more Buses 830.

In the illustrated embodiment, the Storage 815 includes a set of one or more Takes 865. Although depicted as residing in Storage 815, in embodiments, the Takes 865 may reside in any suitable location. In an embodiment, each Take 865 can correspond to a take object that includes data relating to the take, such as the relevant Tags 870 (e.g., the natural language descriptions provided by users), the relevant Data Elements 875 (e.g., the motion capture data and/or audio data), and the like.

In the illustrated embodiment, the Memory 810 includes a Recording Application 850, which may be configured to perform one or more embodiments discussed above. In the illustrated example, the Recording Application 850 includes a Sensor Component 850, a Management Component 855, and an Interface Component 860. Although depicted as discrete components for conceptual clarity, in embodiments, the operations of the depicted components (and others not illustrated) may be combined or distributed across any number of components.

In one embodiment, the Sensor Component 850 may generally be configured to interface with and collect data from the various sensor devices (such as motion capture devices for the face and/or body, audio devices, and the like). For example, the Sensor Component 850 may correspond to the Facial Capture Streaming Data Application 130 and/or Body Capture Streaming Data Application 135 in FIG. 1. The Management Component 855 is generally configured to facilitate management of the take objects (e.g., storage of the objects, updates or modifications to the objects, and the like). For example, the Management Component 855 may correspond to the Motion Capture Synchronization Component 140 and/or Take Management Component 150 in FIG. 1. The Interface Component 860 is generally configured to generate and present interfaces that allow users to interact with the Sensor Component 850, Management Component 855, and/or Takes 865. For example, the Interface Component 860 may correspond to the Recording Interface 145 and/or Take Management Interface 155 in FIG. 1.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:

configuring a recording aspect of a first take object through a selection of a first sensor data type and a second sensor data type within a take object region of a user interface, wherein the first sensor data type is different from the second sensor data type, and wherein the first take object is a unified and parameterized data object configured to combine and synchronize first data of the first sensor data type with second data of the second sensor data type;

initiating, through selection of a graphic element of the user interface and for a first performance in a physical environment, simultaneous capture of first sensor data from a first sensor and second sensor data from a second sensor based on the selection of the first and second sensor data types, respectively;

responsive to the selection of the graphic element, transitioning the user interface to an armed state for locking one or more recording attributes used for recording the first and second sensor data to generate combined captured sensor data including facial movement capture data from the first sensor and body movement capture data from the second sensor, wherein the one or more recording attributes include at least one of (a) a character for which the combined recorded data should be used, (b) a recording path defining where the combined recorded data will be stored, (c) a display name for the first take object, (d) an audio selection for the first take object, (e) an indication to output the audio selection in the physical environment during recording of the first and second sensor data, and (f) an indication that the first and second sensor data will be recorded for the first take object;

synchronizing the captured first sensor data with the captured second data to generate synchronized data that aligns a first data stream of the captured first sensor data with a second data stream of the captured second sensor data;

storing the synchronized data as the first take object including at least one first motion capture element from the first performance;

displaying an indication of the first take object on a timeline;

generating an animatic based on the first take object; and generating an animation based on (a) the animatic, and (b) a modified take object created (i) by adding a second motion capture element from a second performance included in a second take object different from the first take object, or (ii) by replacing the first motion capture element with the second motion capture element.

2. The method of claim 1, wherein:

the first take object further comprises a third motion capture element from the first performance, and the modified take object is created by replacing the third motion capture element from the first take object with the second motion capture element from the second take object.

3. The method of claim 1, further comprising, responsive to a request to modify the first take object into the modified take object:

identifying a plurality of alternative take objects that can be used to modify the first take object, wherein the plurality of alternative take objects includes the second take object; and responsive to a selection of the second take object from the plurality of alternative take objects, presenting the second motion capture element of the second take object for display.

4. The method of claim 3, wherein:

the first performance corresponds to a first character of a plurality of characters; and identifying the plurality of alternative take objects comprises selecting take objects, from a stored list of take objects, that correspond to the first character.

5. The method of claim 1, wherein the synchronized data includes the body movement capture data from the first sensor, the second motion capture element includes facial movement capture data from the second take object, and wherein the modified take object is created by combining the body movement capture data from the first sensor with the facial movement capture data from the second take object.

6. The method of claim 5, wherein generating the animation further includes rendering the body movement capture data from the first motion capture element of the first take object and the facial movement capture data from the second take object on a single character in a three-dimensional scene.

7. The method of claim 1, wherein transitioning the user interface to the armed state locks a recording attribute to output the audio selection in the physical environment during recording of the first and second sensor data, and further comprising:

recording the audio selection from the physical environment during the first performance; and the audio selection that is recorded during the first performance is (i) included in the first take object, and/or (ii) outputted into the physical environment during the second performance.

8. The method of claim 1, further comprising:

receiving user feedback relating to the first motion capture element; and tagging the first take object using the user feedback.

9. The method of claim 1, wherein the animatic and the animation are generated using a same rendering engine.

10. The method of claim 1, wherein each of the first and second take objects include a combined collection of data segments, and wherein synchronizing the captured first sensor data with the captured second data includes aligning a collection of captured facial movement data segments from the first data stream with a collection of captured body movement data segments from the second data stream.

11. A non-transitory computer-readable medium containing computer program code that, when executed by operation of one or more computer processors, performs an operation comprising:

configuring a recording aspect of a first take object through a selection of a first sensor data type and a second sensor data type within a take object region of a user interface, wherein the first sensor data type is different from the second sensor data type, and wherein the first take object is a unified and parameterized data object configured to combine and synchronize first data of the first sensor data type with second data of the second sensor data type;

initiating, through selection of a graphic element of the user interface and for a first performance in a physical environment, simultaneous capture of first sensor data from a first sensor and second sensor data from a second sensor based on the selection of the first and second sensor data types, respectively:

responsive to the selection of the graphic element, transitioning the user interface to an armed state for locking one or more recording attributes used for recording the first and second sensor data to generate combined captured sensor data including facial movement capture data and from the first sensor and body movement capture data from the second sensor, wherein the one or more recording attributes include at least one of (a) a character for which the combined recorded data should be used, (b) a recording path defining where the combined recorded data will be stored, (c) a display name for the first take object, (d) an audio selection for the first take object, (e) an indication to output the audio selection in the physical environment during recording of the first and second sensor data, and (f) an indication that the first and second sensor data will be recorded for the first take object;

synchronizing the captured first sensor data with the captured second data to generate synchronized data that aligns a first data stream of the captured first sensor data with a second data stream of the captured second sensor data:

storing the synchronized data as the first take object including at least one first motion capture element from the first performance;

displaying an indication of the first take object on a timeline;

generating an animatic based on the first take object; and generating an animation based on (a) the animatic, and (b) a modified take object created (i) by adding a second motion capture element from a second performance included in a second take object different from the first take object, or (ii) by replacing the first motion capture element with the second motion capture element.

12. The non-transitory computer-readable medium of claim 11, wherein:

the first take object further comprises a third motion capture element from the first performance, and the modified take object is created by replacing the third motion capture element from the first take object with the second motion capture element from the second take object.

13. The non-transitory computer-readable medium of claim 11, the operation further comprising, responsive to a request to modify the first take object into the modified take object:

identifying one or more alternative take objects that can be used to modify the first take object, wherein the one or more alternative take objects include the second take object; and responsive to a selection of the second take object from the one or more alternative take objects, presenting the second motion capture element of the second take object for display.

14. The non-transitory computer-readable medium of claim 13, wherein:

the first performance corresponds to a first character of a plurality of characters; and identifying the one or more alternative take objects comprises identifying data objects, from a plurality of take objects, that correspond to the first character.

15. The non-transitory computer-readable medium of claim 11, wherein the synchronized data includes the body movement capture data from the first sensor, the second motion capture element includes facial movement capture data from the second take object, wherein the modified take object is created by combining the body movement capture data from the first sensor with the facial movement capture data from the second take object, and wherein generating the animation further includes rendering the body movement capture data and the facial movement capture data on a single character in a three-dimensional scene.

16. The non-transitory computer-readable medium of claim 11, wherein transitioning the user interface to the armed state locks a recording attribute to output the audio selection in the physical environment during recording of the first and second sensor data, and the operation further comprising:

recording the audio selection from the physical environment during the first performance; and the audio selection that is recorded during the first performance is (i) included in the first take object, and/or (ii) outputted into the physical environment during the second performance.

17. A system comprising:

one or more computer processors; and a memory containing a program which, when executed by the one or more computer processors, performs an operation, the operation comprising:

configuring a recording aspect of a first take object through a selection of a first sensor data type and a second sensor data type within a take object region of a user interface, wherein the first sensor data type is different from the second sensor data type, and wherein the first take object is a unified and parameterized data object configured to combine and synchronize first data of the first sensor data type with second data of the second sensor data type;

initiating, through selection of a graphic element of the user interface and for a first performance in a physical environment, simultaneous capture of first sensor data from a first sensor and second sensor data from a second sensor based on the selection of the first and second sensor data types, respectively;

responsive to the selection of the graphic element, transitioning the user interface to an armed state for locking one or more recording attributes used for recording the first and second sensor data to generate combined captured sensor data including facial movement capture data from the first sensor and body movement capture data from the second sensor, wherein the one or more recording attributes include at least one of (a) a character for which the combined recorded data should be used, (b) a recording path defining where the combined recorded data will be stored, (c) a display name for the first take object, (d) an audio selection for the first take object, (e) an indication to output the audio selection in the physical environment during recording of the first and second sensor data, and (f) an indication that the first and second sensor data will be recorded for the first take object;

synchronizing the captured first sensor data with the captured second data to generate synchronized data that aligns a first data stream of the captured first sensor data with a second data stream of the captured second sensor data;

storing the synchronized data as the first take object including at least one first motion capture element from the first performance;

displaying an indication of the first take object on a timeline;

generating an animatic based on the first take object; and generating an animation based on (a) the animatic, and (b) a modified take object created (i) by adding a second motion capture element from a second performance included in a second take object different from the first take object, or (ii) by replacing the first motion capture element with the second motion capture element.

18. The system of claim 17, wherein:

the first take object further comprises a third motion capture element from the first performance, and the modified take object is created by replacing the third motion capture element from the first take object with the second motion capture element from the second take object.

19. The system of claim 17, the operation further comprising, responsive to a request to modify the first take object into the modified take object:

identifying a plurality of alternative take objects that can be used to modify the first take object, wherein the one or more alternative take objects include the second take object; and responsive to a selection of the second take object from the one or more alternative take objects, presenting the second motion capture element of the second take object for display.

20. The system of claim 19, wherein:

the first performance corresponds to a first character of a plurality of characters; and identifying the plurality of alternative take objects comprises identifying take objects that correspond to the first character.

21. The system of claim 17, wherein transitioning the user interface to the armed state locks a recording attribute to output the audio selection in the physical environment during recording of the first and second sensor data, and the operation further comprising:

recording the audio selection from the physical environment during the first performance; and the audio selection that is recorded during the first performance is (i) included in the first take object, and/or (ii) outputted into the physical environment during the second performance.

* * * * *